US011964825B2

United States Patent
Kadoguchi (10) Patent No.: US 11,964,825 B2
(45) Date of Patent: Apr. 23, 2024

(54) TRANSPORT DEVICE AND TRANSPORT SYSTEM

(71) Applicant: Murata Machinery, Ltd., Kyoto (JP)

(72) Inventor: Kenji Kadoguchi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 906 days.

(21) Appl. No.: 16/977,047

(22) PCT Filed: Jan. 30, 2019

(86) PCT No.: PCT/JP2019/003129
§ 371 (c)(1),
(2) Date: Aug. 31, 2020

(87) PCT Pub. No.: WO2019/167526
PCT Pub. Date: Sep. 6, 2019

(65) Prior Publication Data
US 2021/0039896 A1     Feb. 11, 2021

(30) Foreign Application Priority Data
Mar. 1, 2018  (JP) ................. 2018-036630

(51) Int. Cl.
*B65G 41/02*    (2006.01)
*B65G 13/08*    (2006.01)
(Continued)

(52) U.S. Cl.
CPC ............. *B65G 41/02* (2013.01); *B65G 13/08* (2013.01); *B65G 13/12* (2013.01); *B65G 47/52* (2013.01);
(Continued)

(58) Field of Classification Search
CPC ........ B65G 47/52; B65G 47/96; B65G 41/02; B65G 23/23; B65G 2201/02; B65G 54/02; B61B 13/08; B61B 13/12
(Continued)

(56) References Cited

U.S. PATENT DOCUMENTS 4,278,164 A * 7/1981 Matsui .................... B66B 23/02
                                              104/165
5,762,767 A   6/1998 Yamada et al.
(Continued)

FOREIGN PATENT DOCUMENTS

CN    105151803 A  * 12/2015 ............. B65G 13/04
DE   102012207007 A1 * 10/2013 ............. B60L 13/04
(Continued)

OTHER PUBLICATIONS

English translation of the International Preliminary Report on Patentability dated Sep. 3, 2020, of counterpart International Application No. PCT/JP2019/003129.
(Continued)

*Primary Examiner* — Zachary L Kuhfuss
*Assistant Examiner* — James William Jones
(74) *Attorney, Agent, or Firm* — DLA Piper LLP (US)

(57) ABSTRACT

A transport device includes a carriage that travels along a traveling path that is predetermined; a transfer mechanism provided on the carriage and transfers an article in a transfer space set in the traveling path; a first movable element that is a rod shaped component attached to the carriage, extends in a traveling direction of the carriage, and operates by magnetism to drive the transfer mechanism; and a first stator fixedly disposed with respect to the traveling path, has a partially cutout ring shape, and causes the first movable element to operate by magnetism when part of the carriage is positioned outside the transfer space.

8 Claims, 7 Drawing Sheets

(51) Int. Cl.
*B65G 13/12* (2006.01)
*B65G 47/52* (2006.01)
*B65G 47/96* (2006.01)
*B65G 23/23* (2006.01)
*B65G 54/02* (2006.01)

(52) U.S. Cl.
CPC .............. *B65G 47/96* (2013.01); *B65G 23/23* (2013.01); *B65G 54/02* (2013.01); *B65G 2201/02* (2013.01)

(58) Field of Classification Search
USPC ........................................................ 104/165
See application file for complete search history.

(56) References Cited

U.S. PATENT DOCUMENTS

| | | | | |
|---|---|---|---|---|
| 6,854,584 | B2* | 2/2005 | Henson | B65G 17/345 |
| | | | | 198/370.1 |
| 2006/0236890 | A1* | 10/2006 | Lamb | B61B 13/08 |
| | | | | 104/282 |
| 2015/0068870 | A1* | 3/2015 | Beer | B65G 47/52 |
| | | | | 198/463.3 |
| 2016/0114988 | A1* | 4/2016 | Unterseher | B65G 54/02 |
| | | | | 198/465.1 |
| 2017/0057751 | A1* | 3/2017 | Fujihara | B65G 47/8807 |
| 2020/0030995 | A1* | 1/2020 | Lu | H02K 7/14 |

FOREIGN PATENT DOCUMENTS

| | | | |
|---|---|---|---|
| JP | 57-137229 A | | 8/1982 |
| JP | 02-70605 A | | 3/1990 |
| JP | 2-86514 A | | 3/1990 |
| JP | H0286514 A | * | 3/1990 |
| JP | 5-39114 A | | 2/1993 |
| JP | 5-328535 A | | 12/1993 |
| JP | 6-245328 A | | 9/1994 |
| JP | H06245328 A | * | 9/1994 |
| JP | 8-175659 A | | 7/1996 |
| JP | 2000-185817 A | | 7/2000 |
| JP | 2000185817 A | * | 7/2000 |
| JP | 2001-225943 A | | 8/2001 |
| JP | 2009-234721 A | | 10/2009 |
| JP | 2009234721 A | * | 10/2009 |
| KR | 20160129879 A | * | 3/2015 |
| WO | WO-2016067872 A1 | * | 5/2016 ............. B65G 47/82 |

OTHER PUBLICATIONS

Office Action dated Mar. 14, 2022, of counterpart Taiwanese Patent Application No. 108105651, along with an English translation.

* cited by examiner

TRANSPORT DEVICE AND TRANSPORT SYSTEM

TECHNICAL FIELD

This disclosure relates to a transport device and a transport system in which a carriage including a transfer mechanism travels along a transport path.

BACKGROUND

Conventionally, a transport device transports articles transferred onto carriages, which are called slats, pallets and so on, by causing the carriages to circulate individually along a traveling path by using a ground primary-side linear motor (for example, see Japanese Unexamined Patent Application Publication No. 5-328535). However, Japanese Unexamined Patent Application Publication No. 5-328535 does not clearly state how articles are transferred onto the carriages. In general, after a carriage is stopped in a transfer space, the transfer device is caused to operate to load an article onto the carriage.

It could therefore be helpful to provide a transport device and a transport system that effectively transport an article from a loading device to a carriage.

SUMMARY

I provide a transport device that includes: a carriage that travels along a traveling path that is predetermined; a transfer mechanism that is provided on the carriage and transfers an article in a transfer space set in the traveling path; a first movable element that is a rod shaped component attached to the carriage, extends in a traveling direction of the carriage, and operates by magnetism to drive the transfer mechanism; and a first stator that is fixedly disposed with respect to the traveling path, has a partially cutout ring shape, and causes the first movable element to operate by magnetism when part of the carriage is positioned outside the transfer space.

The above configuration includes a first example where the carriage is not within the transfer space and before the article is transferred onto the carriage, or a second example where the carriage has not exited the transfer space after the article is transferred onto the carriage. The first stator can cause the first movable element to operate to control the speed of the transfer mechanism in the first example and/or the second example. With this, the transfer mechanism can perform at least one of operations of accelerating in the first example or decelerating in the second example. With the former operation, the transfer mechanism can be ready to receive an article when the carriage arrives at the transfer space or at an early point after the carriage arrives at the transfer space and an article can be transferred onto the carriage early. With the latter operation, the transfer mechanism can decelerate while the carriage to which an article is transferred is exiting the transfer space. In other words, the carriage can exit the transfer space early after an article is transferred onto the carriage. Thus, the efficiency of the transport device can be improved.

Moreover, a first stator may cause the first movable element to operate by magnetism when the carriage is entirely positioned within the transfer space.

With this, the first stator can cause the first movable element to operate to drive the transfer mechanism to receive an article not only during preparation of the transfer mechanism, but also when an article is transferred.

Moreover, the first stator is disposed in at least one of one end in the transfer space or an other end in the transfer space in the traveling direction.

With the above structure, when the first stator is positioned in an end on a side in the transfer space where the carriage first passes through, the first stator can cause the first movable element to operate at an early point after the carriage enters the transfer space, and thus the preparation of the transfer mechanism can be started early. On the other hand, when the first stator is positioned in an end on a side in the transfer space where the carriage passes through last, the first stator can cause the first movable element to operate until immediately before the carriage completely exits the transfer space. The carriage can thus exit the transfer space early after transfer of an article is completed.

Moreover, the transport device may further include an additional first stator fixedly disposed with respect to the traveling path in the transfer space, has a partially cutout ring shape, and causes the first movable element to operate by magnetism. The additional first stator may be disposed in at least one of a location outside the transfer space and near one end of the transfer space in the traveling direction or a location outside the transfer space and near an other end of the transfer space in the traveling direction.

With this, preparation for operation of the transfer mechanism can be started when the carriage is entirely positioned outside the transfer space, and thus the transporting efficiency can be further improved.

Moreover, the transport device may further include: a second stator disposed continuously or discretely along the traveling path, and a second movable element attached to the carriage, operates by magnetism from the second stator, and causes the carriage to travel along the traveling path.

With this, the carriage can travel smoothly and shaking of the article being transferred on the carriage can be suppressed.

Moreover, an absolute value of acceleration of the transfer mechanism before the transfer mechanism receives the article in the transfer space may be greater than an absolute value of deceleration of the transfer mechanism after the transfer mechanism receives the article, the acceleration being performed by the first movable element that operates by magnetism from the first stator.

With this, preparation for operation of the transfer mechanism can be completed early and the article received on the transfer mechanism can be stably transferred to a holding position.

To accomplish this, a transport system can also include: the transport device; and a loading device that loads an article into the transfer space in a direction intersecting the traveling path.

Hence, preparation for operation of the transfer mechanism can be started before the carriage arrives at the transfer space. The transfer mechanism can be ready to receive an article when the carriage arrives at the transfer space, and the article can be loaded using the loading device and transferred onto the carriage early. Thus, the transporting efficiency of the transport system can be improved. Moreover, this also allows the transfer mechanism to decelerate when the carriage is exiting the transfer space, and thus the transporting efficiency may be further improved.

Moreover, the loading device is disposed to load the article in a loading direction perpendicular to the traveling path, and the transfer mechanism may be a conveyor that moves the article in a direction perpendicular to a traveling direction of the carriage.

This structure downsizes the area required to install the whole transport system.

The transport device and the transport system thus make it possible to improve the efficiency of transporting articles.

REFERENCE SIGNS LIST 100 transport system
101 transport device
102 loading device
110 transfer space
111 carriage
112 transfer mechanism
113 first movable element
114 first stator
115 second movable element
116 second stator
117 traveling rails
118 wheel
119 base
120 second stator
121 endless ring component
122 roller
123 transmittance component
200 article

DETAILED DESCRIPTION

An example of a transport device and a transport system are described in detail below, with reference to drawings. The example described below shows a general or specific example. Numerical values, shapes, materials, structural elements, the arrangement and connection of the structural elements, steps, the processing order of the steps and the like shown in the following example are merely representative examples, and are not intended to limit the scope of this disclosure. Among the structural elements in the following example, structural elements not recited in any one of the independent claims representing the broadest concepts are described as optional structural elements.

Moreover, the figures are schematic diagrams in which emphasis, omission, and adjustment of ratios are appropriately performed for illustrative purposes. The shapes, positional relationships, and ratios in the figures may differ from the actual shapes, positional relationships, and ratios.

Figure 1:
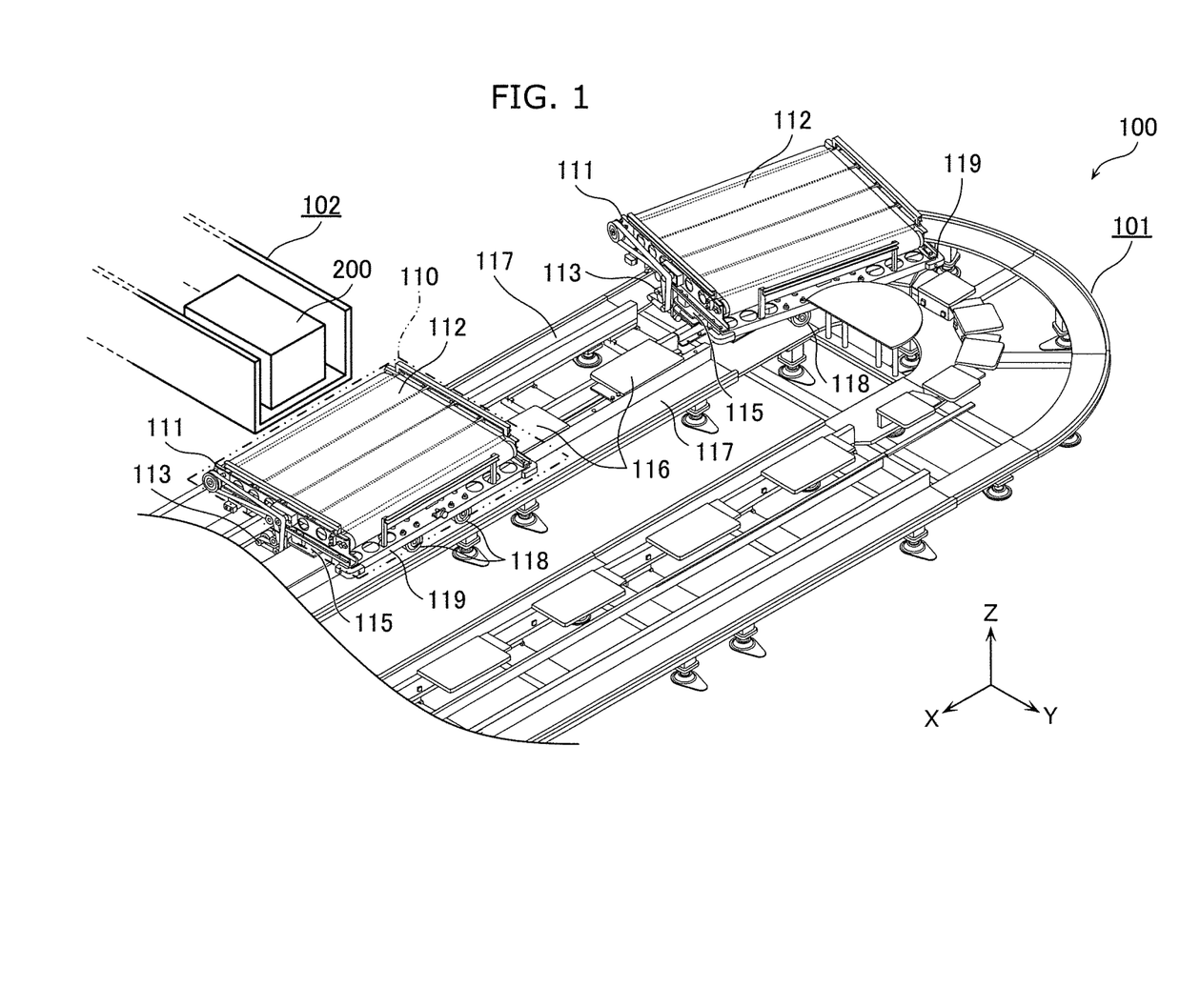
FIG. 1 is an oblique view of a transport system according to an example.
Figure 2:
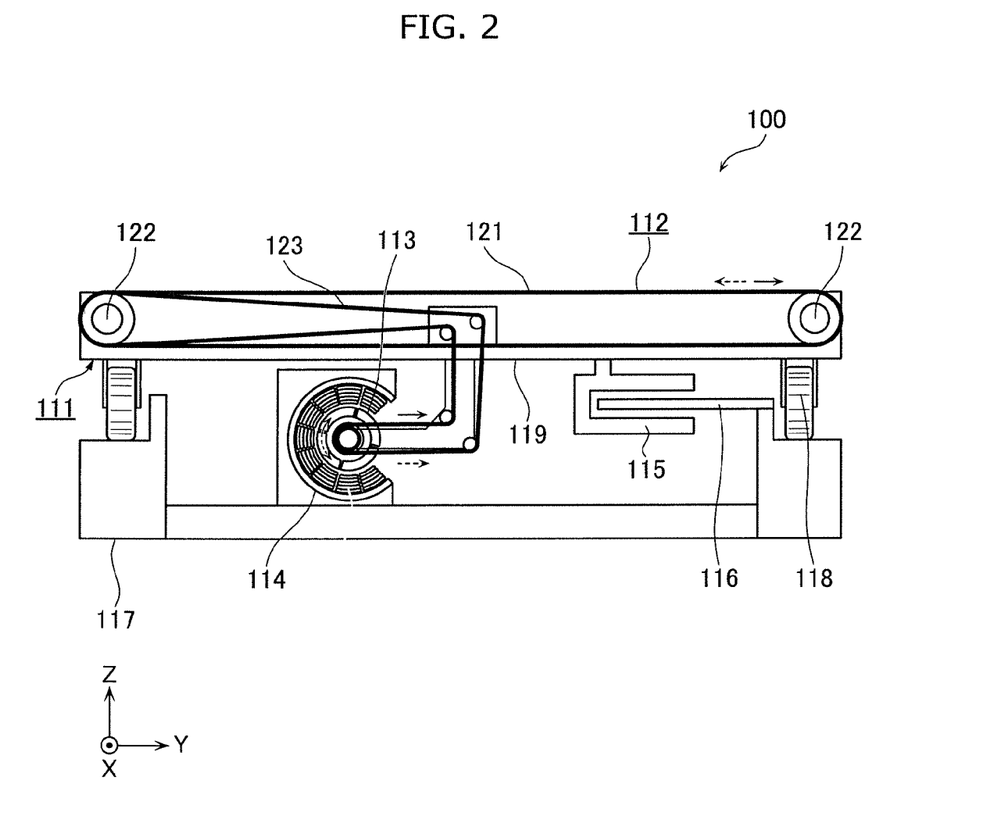
FIG. 2 illustrates a carriage of a transport device according to the example as seen from a traveling direction.

FIG. 1 is an oblique view of a transport system. FIG. 2 illustrates a carriage of a transport device as seen from a traveling direction.

Transport system 100 is a system that transports article 200 which is held by carriage 111 along a transport path (for example, part of an oval transport path is illustrated in FIG. 1), and transfers article 200 into and from transfer space 110 that is predetermined. Transport system 100 includes transport device 101 including carriages 111 and loading device 102 that loads article 200 into transfer space 110 that is predetermined. Transfer space 110 is a virtual space indicating a position where each carriage 111 stops to receive article 200 from loading device 102. More specifically, transfer space 110 is a virtual cuboid space having a minimum volume that includes carriage 111 and all of the components that travel along with carriage 111.

Loading device 102 is a device that loads article 200 onto carriage 111 placed in transfer space 110 in a direction intersecting the traveling path. The types of loading device 102 are not particularly limited. A belt conveyor may be employed. Furthermore, loading device 102 can put article 200 on standby at a position upstream of the flow of article 200, accelerate article 200 to a predetermined speed based on information about arrival of carriage 111 at transfer space 110, and load article 200 onto carriage 111 in transfer space 110.

Loading device 102 may be disposed to load an article in a loading direction perpendicular to the traveling path of transport device 101 to reduce the space for placing the whole transport system 100.

Transport device 101 may be a device that causes a plurality of carriages 111 to travel using a linear motor along traveling rails 117 that form a transport path. Transport device 101 includes carriages 111, transfer mechanism 112 and second movable element 115 that are attached to carriage 111, first stator 114 disposed on the transport path, and second stator 116.

Traveling rails 117 are components for forming the transport path along which carriage 111 travels. The shape of traveling rails 117 is not particularly limited. Traveling rails 117 may be two elongated components, and made of metal such as aluminum and an aluminum alloy, for example. Traveling rails 117 may be made of other metal or resin. Although illustration of traveling rails 117 is partially omitted in FIG. 1, traveling rails 117 may be composed of two parallel components each having an elliptical ring shape and having a quadrilateral cross section.

Carriage 111 travels along a traveling path formed by traveling rails 117. A driving source that causes carriage 111 to travel is not particularly limited. Carriage 111 need not have a battery or an electric motor, and a linear motor that obtains driving force in the traveling direction by magnetism from outside of carriage 111 may be employed. More specifically, carriage 111 includes second movable element 115 having permanent magnets. Second movable element 115 generates force in the traveling direction by magnetism from second stators 116 disposed continuously or discretely along the traveling path of carriage 111, and causes carriage 111 to travel along the traveling path.

Second stators 116 are disposed throughout the predetermined transport path. More specifically, second stators 116 are a plurality of coils aligned on an elongated plate material disposed along the predetermined transport path. In other words, the coils practically function as second stators 116. Each of the coils included in second stator 116 generates a magnetic field independently by being controlled individually by a controller, which is not illustrated in the figures. Accordingly, second stators 116 can cause a plurality of carriages 111 to travel along traveling rails 117 by being controlled individually by a controller.

Second movable element 115 includes a plurality of permanent magnets, for example. The permanent magnets included in second movable element 115 are aligned in the traveling direction of carriage 111. The permanent magnets of second movable elements 115 are disposed to sandwich second stator 116 as shown in FIG. 2. In other words, the permanent magnets of second movable element 115 are disposed on opposite sides of second stator 116 and aligned in the traveling direction. The permanent magnets aligned on one side of second stator 116 are disposed such that the north poles (N-poles) and the south poles (S-poles) alternately face second stator 116. The permanent magnets aligned on the other side of second stator 116 are also disposed such that the N-poles and the S-poles alternately face second stator 116, but are arranged in an opposite order such that opposing faces form a pair of N- and S-poles. Second movable element 115 is not limited to include two lines of the permanent magnets, and may include a single line of the permanent magnets. Carriage 111 includes base 119 that serves as its structural base. Other than second movable element 115, transfer mechanism 112 and first movable element 113 are attached to base 119. Furthermore, wheels 118 to be placed and roll on traveling rails 117 are attached to the bottom of base 119 of carriage 111.

Transfer mechanism 112 is provided on carriage 111. Transfer mechanism 112 receives article 200 from loading device 102 in transfer space 110 set in the traveling path to move the article to a predetermined position on carriage 111, and moves article 200 transported by carriage 111 to an unloading device (not illustrated). The types of transfer mechanism 112 are not particularly limited. Transfer mechanism 112 may be a mechanism known as a conveyor that can move an article in a direction perpendicular to the traveling direction of carriage 111. Transfer mechanism 112 includes endless ring component 121 that moves article 200 while article 200 is placed on endless ring component 121, a pair of rollers 122 that circulate endless ring component 121 along a predetermined track, and transmittance component 123 that transmits driving force from first movable element 113 to one of the pair of rollers 122.

Examples of endless ring component 121 include a rubber ring belt and a component formed by connecting plate components to obtain a ring shape. Endless ring component 121 is a component stretched between the pair of rollers 122, and can circulate the predetermined track in a forward direction or an inverse direction when rollers 122 are rotated.

Rollers 122 are attached to base 119. Each roller 122 is a cylindrical or circular column component that can rotate around its shaft. Rollers 122 hold endless ring component 121 such that rollers 122 allow endless ring component 121 to circulate around rollers 122.

Transmittance component 123 is a component that transmits driving force generated by first movable element 113 as a rotation of roller 122. The types of transmittance component 123 are not particularly limited, and may be a gear, a shaft, or combination of a gear and a shaft, for example. A belt may be employed.

Transfer mechanism 112 is not limited to the above structure, and may be a roller conveyor without endless ring component 121.

Figure 3:
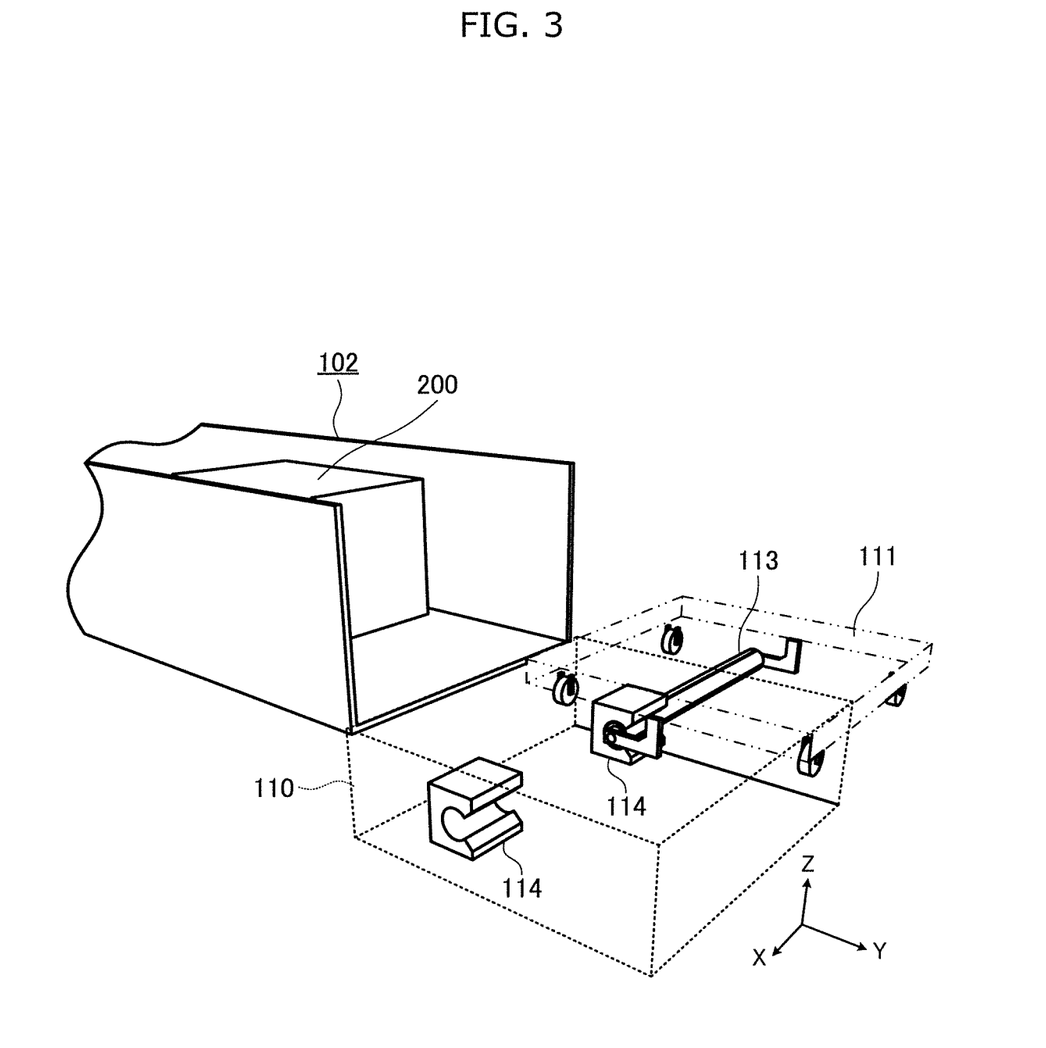
FIG. 3 is an oblique view of a first movable element and a first stator in a state in which the carriage is entering a transfer space, without illustration of a transfer mechanism and a base.
Figure 4:
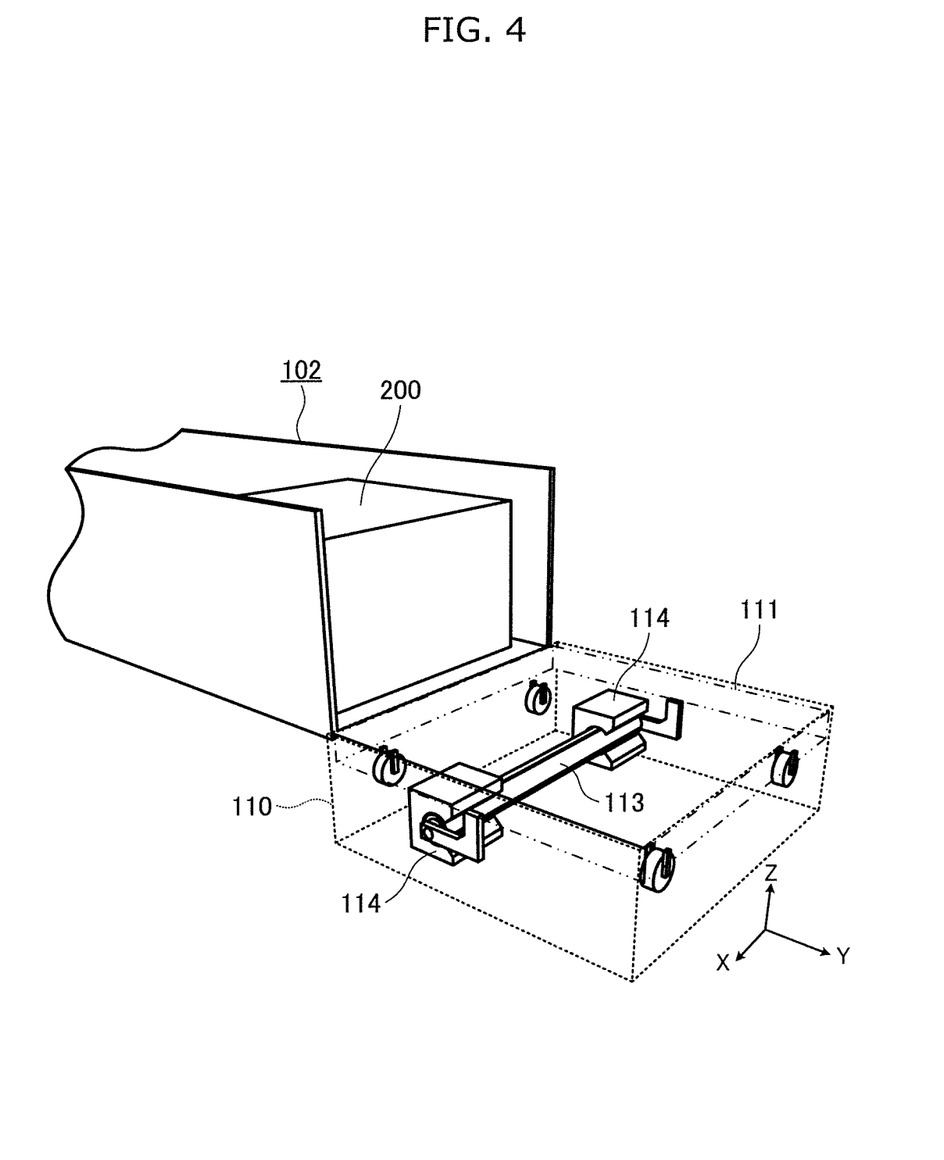
FIG. 4 is an oblique view of the first movable element and the first stator in a state in which the carriage is stopped at the transfer space, without illustration of the transfer mechanism and the base.

FIGS. 3 and 4 are oblique views of the first movable element and the first stator without illustration of the transfer mechanism and the base.

First movable element 113 is a cylindrical rod shaped component attached to base 119 of carriage 111 and extends in the traveling direction of carriage 111. First movable element 113 operates by magnetism and drives transfer mechanism 112. First movable element 113 is a component that rotates by receiving magnetic force resulting from magnetism from first stator 114. First movable element 113 has a plurality of permanent magnets disposed in the circumferential direction such that the N-poles and the S-poles are alternatively aligned in a circumferential direction. As a more specific example, first movable element 113 has a similar structure and functions as a rotor of a brushless motor.

The length of first movable element 113 in the traveling direction of carriage 111 is longer than a length that is necessary to obtain, from first stator 114, driving force having a magnitude that can drive transfer mechanism 112 holding article 200. First movable element 113 may have a length substantially the same as the length of base 119 in the traveling direction of carriage 111. The "length substantially the same" means a length obtained by subtracting, from the length of base 119, the length of a bearing for rotatably holding first movable element 113 with respect to base 119, for example. The length of carriage 111 in the traveling direction means the length of the whole components that move along with carriage 119. When first movable element 113 protrudes from base 119, the length of first movable element 113 may be the length of carriage 111. The permanent magnets provided on the outer circumference of the first movable element 113 are aligned and fixed throughout the length in the shaft direction of first movable element 113. Thus, first movable element 113 can rotate by magnetic force applied to the permanent magnets in any portion along the shaft direction of first movable element 113. In other words, even when part of carriage 111 extends outside transfer space 110 and part of first movable element 113 is positioned in transfer space 110 as illustrated in FIG. 3, first movable element 113 rotates by magnetism from first stator 114 and can cause transfer space 112 to operate when first movable element 113 overlaps first stator 114 by a predetermined length. The magnets aligned in the shaft direction are integrally illustrated in the figures.

First stator 114 is a component fixedly disposed with respect to the traveling path and has a partially cutout ring shape. First stator 114 can cause first movable element 113 to operate by magnetism when first movable element 113 is inserted to a predetermined length, even when part of carriage 111 is positioned outside transfer space 110.

First stator 114 has a cross section having a partially-cutout annular ring shape (C-shaped cross section) so that first movable element 113 attached to carriage 111 can pass through first stator 114 when carriage 111 travels. First stator 114 includes a plurality of coils aligned in the circumferential direction such that the end surfaces of the coils face the circumferential surface of an inserted first movable element 113. Controlling the magnetic field to be generated by each coil of first stator 114 makes it possible to apply magnetic force to the inserted first movable element 113 and rotate the inserted first movable element 113 in a desired direction.

First stator 114 is disposed in at least one of one end or the other end of transfer space 110 in the traveling direction of carriage 111. With this structure, first stator 114 can rotate an inserted first movable element 113 when carriage 111 enters transfer space 110 and also when part of carriage 111 is positioned outside transfer space 110. Carriage 111 can travel back and forth (travel in both of the forward direction and the inverse direction). Therefore, first stators 114 are disposed in both ends of transfer space 110 in the traveling direction. First stator 114 can apply braking force to an operating first movable element 113 by magnetism. Furthermore, first stator 114 can also apply, by magnetism, braking force to first movable element 113 of carriage 111 that is exiting transfer space 110.

Moreover, a single first stator 114 can generate magnetic force that can drive transfer mechanism 112 on which article 200 is placed. In other words, as illustrated in FIG. 4, when carriage 111 is entirely positioned within transfer space 110, a single first movable element 113 is inserted into both of the two first stators 114. Transfer mechanism 112 which has received article 200 from loading device 102 can be driven by causing first movable element 113 to operate by magnetism from one of first stators 114.

Figure 5:
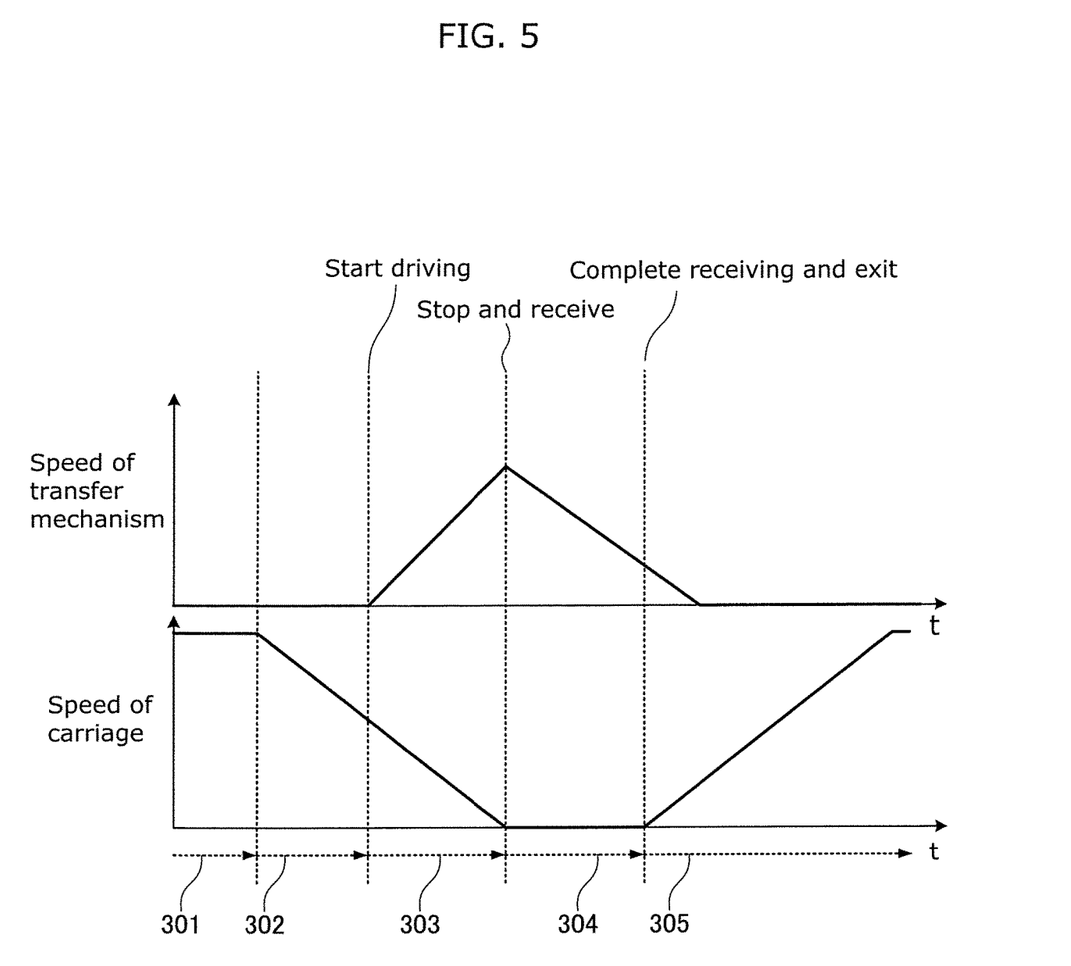
FIG. 5 is a timing chart illustrating operations of the carriage and the transfer mechanism.

Next, operations of transport system 100 will be described. FIG. 5 is a timing chart illustrating operations of the carriage and the transfer mechanism.

When carriage 111 that does not hold article 200 is about to receive article 200 in transfer space 110, carriage 111 is traveling toward transfer space 110 at a predetermined speed (301). Next, to stop carriage 111 within transfer space 110, magnetic force generated by second stator 116 is controlled to reduce the speed of carriage 111 by a predetermined deceleration (302).

Next, as illustrated in FIG. 3, magnetic force is generated by first stator 114 at a timing when first movable element 113 provided on carriage 111 is inserted into first stator 114 that is positioned nearer carriage 111 to rotate first movable element 113 and accelerate transfer mechanism 112 (303). The acceleration of transfer mechanism 112 is adjusted so that transfer mechanism 112 operates at a speed that allows carriage 111 to receive article 200 from loading device 102 at a timing when carriage 111 stops within transfer space 110. Moreover, the speed of loading device 102 is set so that loading device 102 can load article 200 onto carriage 111 at the timing when carriage 111 stops within transfer space 110. The speed of transfer mechanism 112 matches with the speed of loading device 102 at the timing when carriage 111 stops within transfer space 110. Accordingly, as illustrated in FIG. 4, at the timing when carriage 111 stops within transfer space 110, transfer mechanism 112 reaches the predetermined speed, and completes the preparation to receive article 200. At the same timing, loading device 102 moves article 200 to a position where loading device 102 can immediately load article 200 onto transfer mechanism 112 of carriage 111 that is stopped in transfer space 110, and loading device 102 discharges article 200 at the predetermined speed.

Next, when the front end of article 200 is placed onto transfer mechanism 112, first stator 114 applies braking force by magnetism to the rotation of first movable element 113, and then transfer mechanism 112 begins to decelerate (304). At this time, a single first movable element 113 is inserted into both of the two first stators 114, and first movable element 113 rotates by the magnetism from at least one of the two first stators 114.

Next, when the rear end of article 200 in the loading direction exits loading device 102 and article 200 is placed on transfer mechanism 112, carriage 111 starts traveling (305). On the other hand, transfer mechanism 112 continues decelerating while moving article 200 to a predetermined position on transfer mechanism 112. Transport device 101 may be set such that an absolute value of acceleration of transfer mechanism 112 before transfer mechanism 112 receives article 200 in transfer space 110 is greater than an absolute value of deceleration of transfer mechanism 112 after transfer mechanism 112 receives article 200 from loading device 102, the acceleration being performed by first movable element 113 that operates by magnetism from first stator 114. In this way, transfer mechanism 112 can complete the preparation to receive article 200 early.

Moreover, first stator 114 applies braking force to first movable element 113 to decelerate transfer mechanism 112 even when carriage 111 is accelerating. This is because first movable element 113 is disposed also in an end of transfer space 110 located on a side in a direction in which carriage 111 exits transfer space 110. Therefore, as in this example, when carriage 111 enters and exits transfer space 110 in both directions, first stators 114 are desirably disposed in both ends of transfer space 110 in the traveling direction of carriage 111.

Transport system 100 according to the example described above can cause transfer mechanism 112 to operate before carriage 111, which does not have a driving source that drives transfer mechanism 112, stops in transfer space 110. In other words, as compared to causing transfer mechanism 112 to operate by supplied driving force after carriage 111 is stopped, transfer mechanism 112 can be ready to receive article 200 earlier. Thus, transfer of article 200 onto carriage 111 can be started immediately after carriage 111 stops and a time during which carriage 111 is stopped can be shortened, thereby increasing the transporting efficiency.

Furthermore, first stator 114 can apply braking force to transfer mechanism 112 while carriage 111 is exiting transfer space 110, and thus carriage 111 can be started to move while transfer mechanism 112 is receiving article 200 and decelerating article 200 with respect to carriage 111. Thus, it is possible to shorten the time during which carriage 111 is stopped and increase the transporting efficiency of transport device 101 also when carriage 111 exits transfer space 110.

This disclosure is not limited to the above example. For example, examples achieved by any combination of the structural elements described in this Description and examples achieved by excluding some of the structural elements may be considered as representative examples of this disclosure. Furthermore, variations achieved through various modifications to the above example that can be conceived by those skilled in the art without departing from the essence of this disclosure, that is, the meaning of the recitations in the claims, are also included herein.

Figure 6:
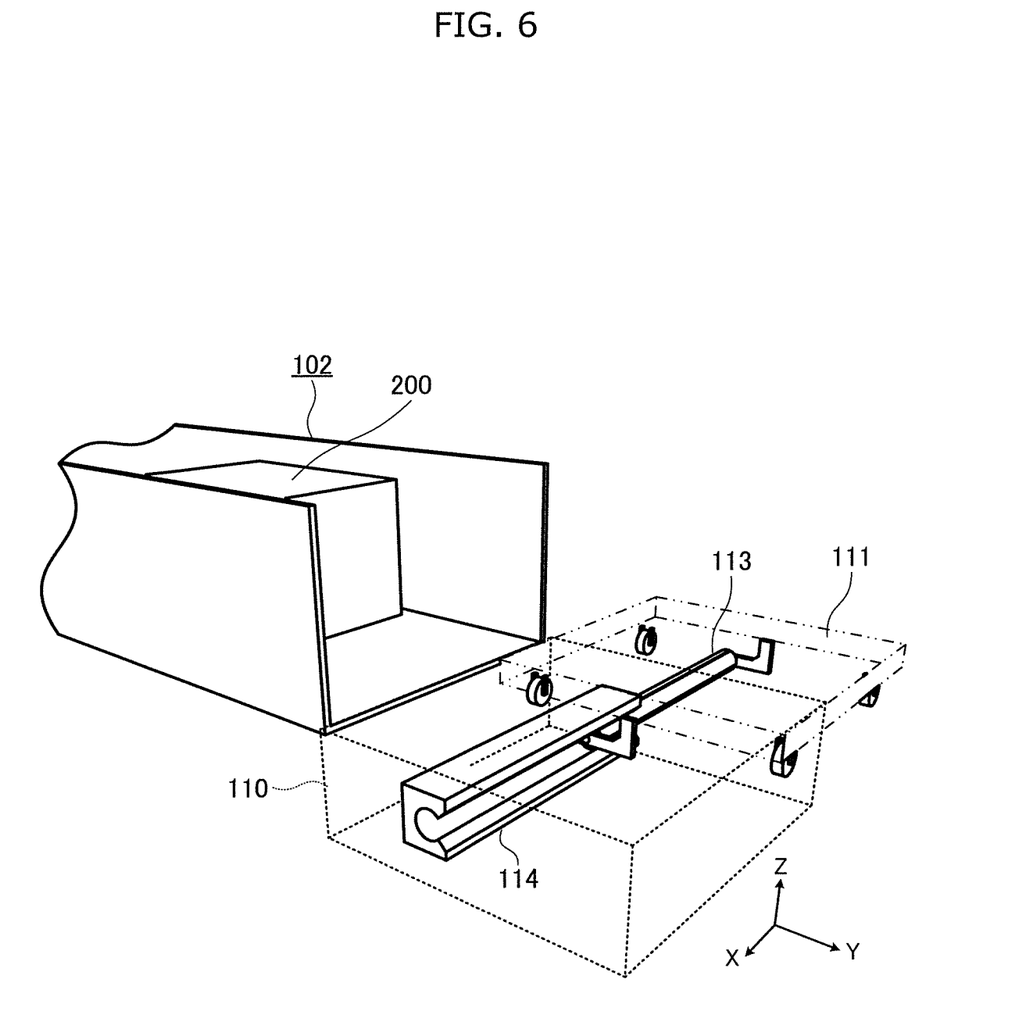
FIG. 6 is an oblique view of a first movable element and a first stator according to another example, without illustration of a transfer mechanism and a base.

For example, as illustrated in FIG. 6, first stators 114 are not limited to be disposed in both ends of transfer space 110. First stator 114 that extends from one end to the other end of transfer space 110 or extends beyond the transfer space may be disposed. In this example, first movable element 113 may be short in the traveling direction.

Figure 7:
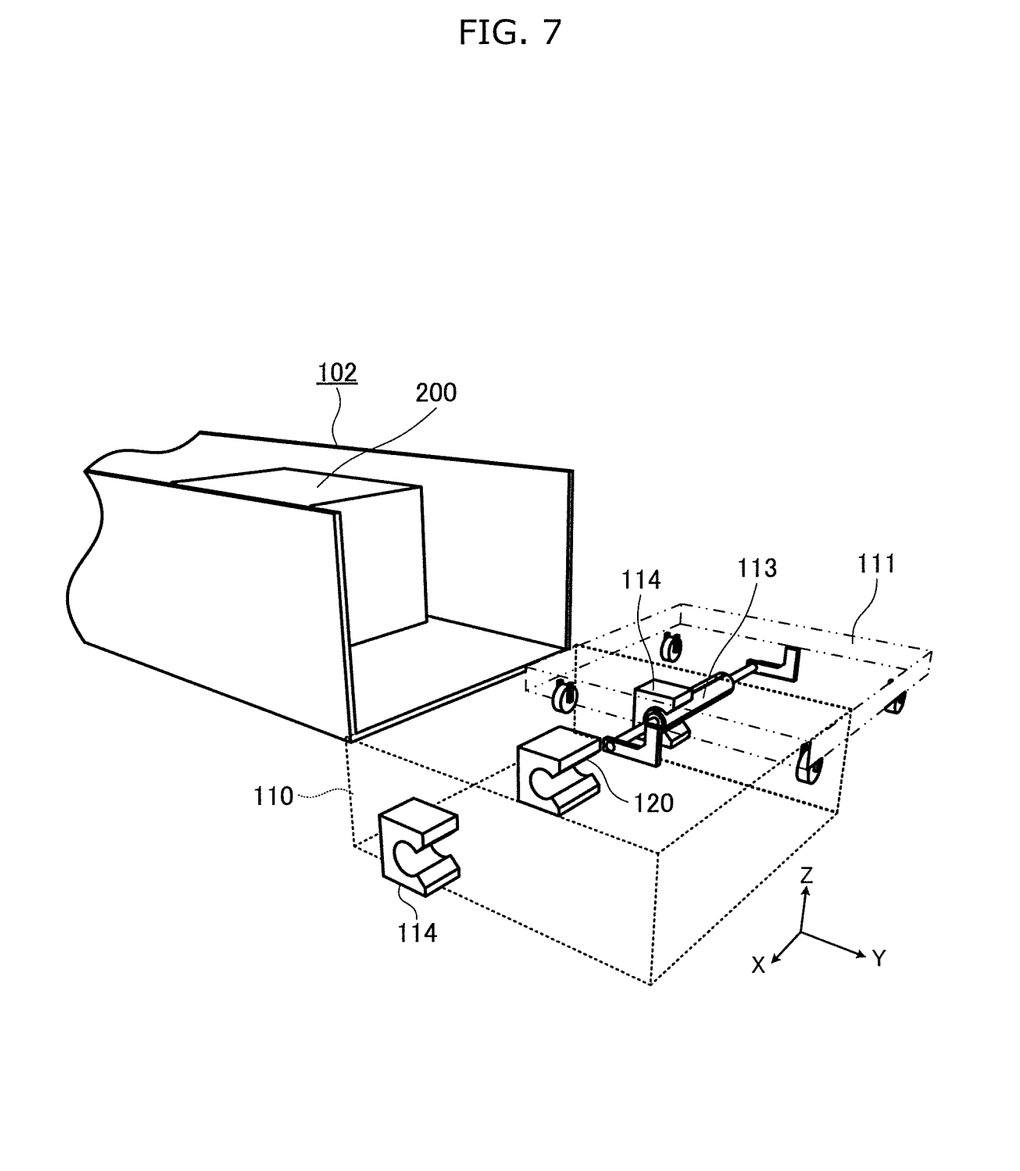
FIG. 7 is an oblique view of a first movable element and a first stator according to still another example, without illustration of a transfer mechanism and a base.

Moreover, as illustrated in FIG. 7, second stator 120 that causes first movable element 113 to operate by magnetism may be further included in transfer space 110, and first stator 114 may be disposed in at least one of a location that is outside transfer space 110 and near one end of transfer space 110 in the traveling direction of carriage 111 or a location that is outside transfer space 110 and near an other end of transfer space 110 in the traveling direction of carriage 111. With this structure, the operation of transfer mechanism 112 can be started earlier than in the above example.

In this example, the length of first stator 114 in the traveling direction may be shorter than the length that is necessary to supply first movable element 113 with driving force having a magnitude that can drive transfer mechanism 112 holding article 200. This is because second stator 120 drives transfer mechanism 112 after transfer mechanism 112 receives article 200. Moreover, first movable element 113 does not need to extend throughout the length of carriage 111 in the traveling direction. First movable element 113 may have a length in such an extent that the total length of first movable element 113 overlaps second stator 120.

Moreover, first stator 114 may be provided in only one of the ends of transfer space 110. With this, the time during which the carriage is stopped can be reduced when the carriage arrives at or exits from the transfer space, even when the carriage travels in both directions.

Moreover, the loading direction of article 200 and the traveling path of carriage 111 do not need to be perpendicular to each other, and may intersect at an angle other than a right angle.

Moreover, the absolute value of the acceleration of transfer mechanism 112 does not need to be greater than the absolute value of the deceleration. For example, these absolute values may be the same.

Moreover, the speed of loading device 102 and the speed of transfer mechanism 112 do not need to match completely when article 200 is being transferred. These speeds may be close values in such a degree that an article does not roll over.

Moreover, the structure that causes carriage 111 to travel is not limited to a linear motor, and may be a structure in which driving force for traveling can be mechanically applied to carriage 111 from outside of carriage 111.

Moreover, a plurality of transfer spaces 110 may be set in the traveling path, and transfer space 110 for discharging article 200 may be set in the traveling path.

INDUSTRIAL APPLICABILITY

My transport devices and systems are applicable in distribution centers or factories that need to transport articles efficiently.

The invention claimed is:

1. A transport device comprising:
a carriage that travels along a traveling path that is predetermined;
a transfer mechanism provided on the carriage and transfers an article in a transfer space set in the traveling path;
a first movable element that is a rod shaped component attached to the carriage, extends in a traveling direction of the carriage, and operates by magnetism to drive the transfer mechanism; and
a first stator fixedly disposed with respect to the traveling path, has a partially cutout ring shape, and causes the first movable element to operate by magnetism when part of the carriage is positioned outside the transfer space, wherein
at a timing when the first movable element provided on the carriage is inserted into the first stator that is positioned nearer the carriage, magnetic force is generated by the first stator to rotate the first movable element and accelerate the transfer mechanism, and at a timing when the carriage stops within the transfer space, magnetic force is generated by the first stator to rotate the first movable element to match a speed of the transfer mechanism with a speed of a loading device, and the speed of the loading device is a speed of loading the article into the transfer space in a direction intersecting the traveling path.

2. The transport device according to claim 1, wherein when the carriage is entirely positioned within the transfer space, the first stator causes the first movable element to operate by magnetism.

3. The transport device according to claim 1, wherein the first stator is disposed in at least one of one end in the transfer space or an other end in the transfer space in the traveling direction.

4. The transport device according to claim 1, further comprising:
an additional first stator fixedly disposed with respect to the traveling path in the transfer space, has a partially cutout ring shape, and causes the first movable element to operate by magnetism, wherein
the additional first stator is disposed in at least one of a location outside the transfer space and near one end of the transfer space in the traveling direction or a location outside the transfer space and near an other end of the transfer space in the traveling direction.

5. The transport device according to claim 1, further comprising:
a second stator disposed continuously or discretely along the traveling path, and
a second movable element attached to the carriage, operates by magnetism from the second stator, and causes the carriage to travel along the traveling path.

6. The transport device according to claim 1, wherein an absolute value of acceleration of the transfer mechanism before the transfer mechanism receives the article in the transfer space is greater than an absolute value of deceleration of the transfer mechanism after the transfer mechanism receives the article, the acceleration being performed by the first movable element that operates by magnetism from the first stator.

7. A transport system comprising:
the transport device according to claim 1, and
a loading device that loads an article into the transfer space in a direction intersecting the traveling path.

8. The transport system according to claim 7, wherein
the loading device is disposed to load the article in a loading direction perpendicular to the traveling path, and
the transfer mechanism is a conveyor that moves the article in a direction perpendicular to a traveling direction of the carriage.

* * * * *